United States Patent
Gershenzon et al.

(10) Patent No.: US 6,842,025 B2
(45) Date of Patent: Jan. 11, 2005

(54) APPARATUS AND METHOD FOR MULTIPLE IDENTICAL CONTINUOUS RECORDS OF CHARACTERISTICS ON THE SURFACE OF AN OBJECT AFTER SELECTED STAGES OF MANUFACTURE AND TREATMENT

(75) Inventors: Elik Gershenzon, Daly City, CA (US); Boris Kesil, San Jose, CA (US); Leonid Velikov, San Carlos, CA (US); Yuri Vorobyev, San Carlos, CA (US)

(73) Assignee: MultiMetrixs L.L.C., Santa Clara, CA (US)

( * ) Notice: Subject to any disclaimer, the term of this patent is extended or adjusted under 35 U.S.C. 154(b) by 0 days.

(21) Appl. No.: 10/695,173

(22) Filed: Oct. 29, 2003

(65) Prior Publication Data

US 2004/0158426 A1 Aug. 12, 2004

Related U.S. Application Data (63) Continuation of application No. 10/449,892, filed on Jun. 2, 2003, and a continuation of application No. 10/434,625, filed on May 12, 2003, and a continuation of application No. 10/359,378, filed on Feb. 7, 2003.

(51) Int. Cl.⁷ .......................... G01R 31/02; G01N 21/00
(52) U.S. Cl. .......................................... 324/759; 356/73
(58) Field of Search ................................ 324/600, 629, 324/633, 635, 654, 658, 652, 662, 663, 668, 228, 229, 200, 230, 262, 758, 759, 158.1, 765; 331/44, 45, 46, 56; 427/8, 9; 118/102, 204; 356/138, 141.2, 73, 399, 400, 485, 486, 496, 614, 622; 438/10, 13, 17; 29/593; 702/34, 35, 36; 451/5, 8, 9, 10, 65, 287; 250/548

(56) References Cited

U.S. PATENT DOCUMENTS 5,036,624 A * 8/1991 Steere, Jr. .................... 451/65
5,333,413 A * 8/1994 Hashimoto ..................... 451/9
5,644,400 A * 7/1997 Mundt ......................... 356/400
6,144,892 A * 11/2000 Cheetham et al. ........... 700/108
6,242,353 B1 * 6/2001 Kobayashi et al. .......... 438/692
6,471,571 B2 * 10/2002 Oliver ......................... 451/287
6,473,664 B1   10/2002 Lee
6,593,738 B2    7/2003 Kesil et al.
6,594,002 B2 *  7/2003 Drohan et al. ................ 356/73
6,624,433 B2 *  9/2003 Okumura et al. ........... 250/548

OTHER PUBLICATIONS

U.S. Appl. No. 434,625, filed 2003, Kesil et al.

U.S. Appl. No. 359,378, filed 2003, Kesil et al.

U.S. Appl. No. 386,648, filed 2003, Kesil et al.

\* cited by examiner

*Primary Examiner*—Anjan Deb
*Assistant Examiner*—Hoai-An D. Nguyen (57) ABSTRACT

An apparatus of the invention is intended for multiple identical continuous records of characteristics on the surface of an object, e.g., a semiconductor wafer, after selected stages of manufacture and treatment. The apparatus is provided with a rotary table for rotation of the wafer with a mechanism for installing the wafer in a predetermined initial position for starting measurements from the same point after each selected stage of manufacture or treatment. The measurements are synchronized for all sequential manufacturing stages of the wafer and are carried out with the use of a resonance sensor based on the principles of resonance sensor technology. The recorded information is stored on a memory device, and if the final product has a defect or deviations, the stored information can be easily retrieved for revealing the time, place on the product, and the source of the defect. The same records can also be used for correlation between the defects or deviations and the failure of the final product on quality control and even during exploitation of the chip in a semiconductor device.

46 Claims, 7 Drawing Sheets

APPARATUS AND METHOD FOR MULTIPLE IDENTICAL CONTINUOUS RECORDS OF CHARACTERISTICS ON THE SURFACE OF AN OBJECT AFTER SELECTED STAGES OF MANUFACTURE AND TREATMENT

CROSS-REFERENCE TO RELATED APPLICATIONS

The present patent application is a continuation of the following U.S. patent applications Ser. No. 10/359,378 filed Feb. 7, 2003 and entitled: "Method and Apparatus for Measuring Thickness of Thin Films with Improved Accuracy"; Ser. No. 10/434,625 filed May 12, 2003 and entitled "Method and System for Measuring Thickness of Thin Films with Automatic Stabilization of Measurement Accuracy"; and Ser. No. 10/449,892 filed on Jun. 2, 2003 and entitled "System and Method for Measuring Characteristics of Materials with the Use of a Composite Sensor".

FIELD OF THE INVENTION

The present invention relates to an apparatus and method for continuous record of conditions on the surfaces of semiconductor wafers on all or selected stages of manufacture and treatment. More specifically, the invention relates to the aforementioned apparatus and method, which are based on sensing the surfaces of the disks with the use of resonance sensors operating on the principles of resonance sensor technology.

BACKGROUND OF THE INVENTION

Conversion of a semiconductor wafer into a semiconductor chip comprises a plurality of sequential operations of which more than 90% occur on the wafer. The entire production process may involve hundreds of operations, such as application of metals and dielectrics, doping with legating impurities, heat treatment, application of thin coatings by sputtering, chemical and physical vapor deposition, electroless deposition, etc., various types of plasma surface treatment, multiple photolithographic processes for the formations of patterns, selective removal of parts of coatings in the formation of the aforementioned patterns, etc. In a production process, a semiconductor wafer normally contains hundreds or thousands of individual semiconductor chips produced simultaneously on a single wafer, so that, upon completion of the processes on the wafer, it is cut into hundreds or thousands of individual semiconductor chips. Lead wires are then soldered or otherwise connected to the output terminals of the chips, whereby a product, which is well known to the general public as a "semiconductor chip", is obtained.

Practically all known chips, starting from simple primitive chips with several parts and finishing with VLSIC's (Very Large-Scale Integrated Circuits) are produced in accordance with the aforementioned sequential multiple-stage scenario.

Similar situation, that involves sequential multiple-stage operations, takes place in the production of laser diodes and light-emitting diodes with the only difference that the substrates are made from modifications of GaAs and InP instead of silicon required for the chips. Another field with the same ideology is the production of flat-panel displays. Therefore, it should be understood that though the description given below will relate to semiconductor wafers, it is equally applicable to other products, such as light-emitting diodes, laser diodes, flat-panel displays, or the like.

It is understood that not all of the finally produced semiconductor chips are perfect after the manufacture and that a certain percentage of rejection always exists. The failure may occur practically on any of hundreds or thousands of the aforementioned operations involved in the manufacturing process, and therefore it is very important to control the product quality at different manufacturing stages. It has been known heretofore to provide various manufacturing processes with so-called control charts that comprise graphical representation of variations in selected parameters over time. Such parameters may comprise electrical resistance, capacitance, thickness of the coating measured by ellipsometry, reflectivity, etc. It is understood that if a certain parameter is controlled in real time, deviations of this parameter from the norm can also be corrected in real time. For example, U.S. Pat. No. 6,473,664 issued to Lee, et al. in 2002 discloses a manufacturing process automation system using a file server and its control method. In the proposed automation system, a plurality of machines is connected to a file server via a network, and the job result data produced by the machines are shared by the file server. The job result data processed from a machine (for example, a tester) are stored in the file server. Another machine (for example, a repairer) can execute a job by using the above job result data.

It should be taken into account, however, that even if all the controlled parameters are maintained within the allowable tolerances, the occurrence of the failure is not completely excluded. Such defects may be caused either by deviations of parameters, which are not controlled, or by synergistically caused unfavorable conditions that may occur in the production processes. Furthermore, the parameters are measured by a plurality of strictly specialized devices intended for measuring a specific characteristic such as resistance, film thickness, etc.

Normally, the controlled data is stored either in a central processing unit or in a database. However, the applicants are not aware of any simple, inexpensive, customer-friendly, and well-organized system for continuous recording of various parameters with a single generalized or universal sensor device in the form a certain relative value.

On the other hand, U.S. patent application No. 434,625 filed by the same applicants on May 12, 2003 shows a measurement apparatus based on the use of RST principles, wherein the apparatus has a spindle for rotatingly installing a disk, e.g., a semiconductor wafer, and a cantilever beam attached to the apparatus housing for supporting a carriage with a resonance sensor for radially displacing the sensor above the surface of the wafer. As mentioned in the above application, the rotary and radial movements of the sensor are required merely for positioning the sensor to any measurement point on the surface of the wafer. The application does not teach the use of rotation and radial movements for any other purposes. The apparatus is intended for discrete measurement of characteristics and thickness of thin films and coatings in selected points on the surface of the object being measured.

Since the present invention is based on the use of RST, a new technology developed by Multimetrixs, CA, in the beginning of 1999, it would be advantageous, for better understanding the RST principles, to shortly describe the structure and operation of a conventional inductive sensor, which is one of the electrical-type sensors, widely used for measuring, e.g., film thickness. One example of an inductive sensor of the aforementioned type is the one disclosed in U.S. Pat. No. 6,593,738 issued on Jul. 15, 2003 to Boris Kesil, et al. This patent describes the apparatus and method for thin film diagnostics and includes an example of the setup design for precision measurements using conventional (inductive, Eddy current) and capacitive sensors.

The apparatus consists of an inductive sensor and a proximity sensor, which are rigidly interconnected though a piezo-actuator used for displacements of the inductive sensor with respect to the surface of the object being measured. Based on the results of the operation of the proximity sensor, the inductive sensor is maintained at a constant distance from the controlled surface. Variations in the thickness of the coating film and in the distance between the inductive sensor and the coating film change the current in the inductive coil of the sensor. The inductive sensor is calibrated so that, for a predetermined object with a predetermined metal coating and thickness of the coating, variations in the amplitude of the inductive sensor current reflect fluctuations in the thickness of the coating. The distinguishing feature of the invention resides in the actuating mechanism of microdisplacements and in the measurement and control units that realize interconnection between the proximity sensor and the inductive sensor via the actuating mechanism. The actuating mechanism is a piezo actuator. Measurement of the film thickness in the submicron range becomes possible due to highly accurate dynamic stabilization of the aforementioned distance between the inductive sensor and the object. According to one embodiment, the distance is controlled optically with the use of a miniature interferometer, which is rigidly connected to the inductive sensor. According to another embodiment, the distance is controlled with the use of a capacitance sensor, which is also rigidly connected to the inductive sensor.

A disadvantage of the sensor of the aforementioned patent is that it is very sensitive to variations in the distance between the sensor and the film. This requirement dictates the use of expensive and complicated distance-measurement and distance control means such as micro interferometers or microscopes and piezoactuators.

U.S. patent application No. 359,378 filed by Boris Kesil, et al. on Feb. 7, 2003 describes the principles of RST which are based on the following features: 1) in contrast to the majority of known inductive sensors, the RST sensors operate at resonance conditions; 2) there exist several resonance conditions, and the RST sensors operate mainly under conditions of complete resonance; 3) under conditions of complete resonance, the Q-factor of the system "sensor-object" may be significantly higher than the Q-factor of a single inductive sensor. Incorporation of the aforementioned three features into the structure of the measurement system results in significant improvement of sensitivity and repeatability of measurements and makes it possible to measure characteristics of the film in a wide range of thicknesses from hundreds Angstroms to several tens of microns.

The new apparatus disclosed in U.S. patent application No. 359,378 consists of an inductive coil having specific parameters, an external AC generator operating on frequencies, e.g., from 50 MHz to 2.5 GHz, preferably from 100 MHz to 200 MHz, and a measuring instrument, such as an oscilloscope, voltmeter, etc., for measuring output of the sensor. The coil has miniature dimensions. The invention is based on the principle that the inductive coil of the sensor, active resistance of the coil winding, capacitance of the inductive coil (or a separate capacitor built into the sensor's circuit), and the aforementioned AC generator form an oscillating circuit in which electromagnetic oscillations are excited by the aforementioned AC generator.

The main distinction of the sensor of the device proposed in the aforementioned patent application from all conventional devices of this type is that it operates on very high resonance frequencies in comparison with frequencies used in devices described in the patent applications mentioned above, preferably within the range of 100 to 200 MHz. In order to maintain the aforementioned high frequency range, the oscillating circuit should have specific values of inductance L (several nano-Henries) and capacitance C (several pico-Farades), and in order to provide accurate measurements, the Q-factor for the above frequencies should exceed 10. It has also been found that on such frequencies the capacitive coupling between the coil of the oscillating circuit and the virtual coil induced in the film acquires the same weight as the mutual inductance between the both coils. In other words, the system can be described in terms of inductive-capacitive interaction between the sensor and the film to be measured. The capacitive coupling component determines new relationships between the parameters of the film, mainly the film thickness, and parameters of the resonance oscillating circuit. By measuring the parameters of the resonance oscillating circuit, it becomes possible to measure film thickness in wide ranges including those below 500 Angstroms, as well as other characteristics of the film.

However, in the apparatus of U.S. patent application No. 359,378, the method and system for stabilization of the distance between the sensor and the surface of the film being measured remain the same as in first-mentioned U.S. Pat. No. 6,593,738, and this feature limits significant potentials of the new method and system.

The method and apparatus aimed at still further improvement of properties disclosed in aforementioned U.S. patent application No. 359,378 are described in U.S. patent application Ser. No. 10/386,648 filed by the same applicants (Boris Kesil, et al.) as the previous application on Mar. 13, 2003. This new apparatus allows highly accurate and efficient contactless measurement of film thicknesses below 1000 Angstroms by means of a microwave resonance sensor. The apparatus consists of a special resonator unit in the form of an open-bottom cylinder, which is connected to a microwave swept frequency source via a decoupler and a matching unit installed in a waveguide line that connects the resonator unit with the microwave source.

The microwave generator is fed from a power supply unit through a frequency modulator that may sweep the frequency of microwaves generated by the microwave generator. All the controls can be observed with the use of a display, such as, e.g., a monitor of a personal computer, which may be connected to the microwaveguide line, e.g., via a directed branched waveguide line for directing waves reflected from the resonator, via a reflected wave detector, an amplifier, synchronous detector, A/D converter, and a digital voltmeter. A feedback line is going from a direct wave detector, which is installed in a line branched from the microwaveguide between the decoupler and the matching unit, to the power supply unit. The operation resonance frequency of the resonator sensor unit should be somewhere within the range of swept frequencies of the microwave generator.

In operation, the microwave source generates electromagnetic waves in a certain sweeping range that induces oscillations on the resonance frequency with a Q-factor on the order of $10^4$ or higher in the resonator sensor unit. A distinguishing feature of the resonator of this system is that the design parameters of the resonator unit allow achieving the aforementioned high Q-factor without physical contact of the sensor unit with the film to be tested. As the surface of the film to be measured constitutes the inner surface of the resonator unit, even a slightest deviation in conductivity will exert a significant influence on the Q-factor. The Q-factor, in turn, defines the height of the resonance peak. As the conductivity directly related to the film thickness, it is understood that measurement of the film thickness is reduced to measurement of the resonance peak amplitudes. This means that super-high accuracy inherent in measurement of the resonance peaks is directly applicable to the measurement of the film thickness or film thickness deviations.

However, since this resonator is a three-dimensional or a special device, the measurement surface may have the minimum value on the order of several square millimeters. In such a construction, the diameter of the probe practically cannot be reduced beyond the limit of a few square millimeters. In other words, even though the microwave resonance sensor of the type described in U.S. patent application Ser. No. 10/386,648 is extremely accurate with regard to stabilization of the sensor-object distance, it has limitations with regard to the lateral measurement accuracy. U.S. patent application No. . . . filed by the same applicants on . . . discloses an apparatus for measuring characteristics and thickness of films and thin coatings comprising a portable hand-held sensor unit that comprises a support base for placement onto an object to be measured, e.g., a thin-film coating on a substrate, a sensor head with a resonance sensor based on resonance sensor technology, and means for adjusting the position of the sensor head relative to the object for achieving resonance conditions most optimal for measuring the characteristics and thickness, and a sensor signal receiving and processing unit having means for receiving modulated carrier signals of a predetermined frequency, e.g., 2.4 GHz. The apparatus also contains an external source of the modulated carrier signals located remotely from the portable hand-held sensor unit and having a signal transmitter unit and a predetermined frequency-receiving network with a receiving/transmitting antenna for receiving the aforementioned signals of 2.4 GHz frequency. The apparatus is suitable for measuring characteristics and thickness of films and coatings directly on objects in selected measurement points with accuracy suitable for use in the semiconductor production. It is particularly suitable for measuring properties and thickness of coatings on large objects that cannot be installed on conventional measurement stations or stationary measurement apparatuses.

However, neither the last mentioned apparatuses nor any other apparatus or method known to the applicants are suitable for multiple identical continuous measurement of characteristics of semiconductor wafers or similar products after all or selected stages of the manufacture thereof with the use of a generalized or universal sensor unit, which is based on the principles of the resonance sensor technology (RST) and can produce results of measurement in the form of a certain constantly recorded relative value.

OBJECTS AND SUMMARY OF THE INVENTION

It is an object of the present invention to provide an apparatus and method for multiple identical continuous recording characteristics on the surfaces of semiconductor wafers or similar products after each or after selected stages of the manufacture and treatment. It is another object to measure the aforementioned characteristics by means of a generalized or universal sensor unit in the form of a certain relative value. Still another object is to provide the aforementioned method and apparatus based on the principles of the resonance sensor technology (RST).

An apparatus of the invention comprises: a housing having a spindle unit for rotation of a semiconductor wafer or a similar object, preferably with a frequency of rotation which is constant or varies in accordance with a predetermined law; a wafer angular positioning device for positioning each wafer in a predetermined starting position for starting each measurement; a carriage installed in the housing with a mechanism for radial displacement relative to the wafer; an RST sensor unit installed on the carriage so that it can scan the surface of the wafer being tested along a continuous spiral track started in the aforementioned starting position; a central processing unit for controlling the operations of the spindle unit, the carriage, the RST sensor, etc.; and a storage media such as a high-capacity hard drive disk, or the like, for recording and storing the information obtained in multiple identical spiral scans of the same wafer after completion of all or selected manufacture stages. The method of the invention consists of multiple identical continuous recording of the information about a plurality of characteristics of the wafer surface. These characteristics are recorded in the form of a single relative value by scanning the surface of the rotating wafer along a continuous spiral track with the use of an RST sensor moving in the radial direction of the rotating wafer. The aforementioned characteristics are measured a plurality of times after completion of selected manufacturing processes starting each measurement from the same initial point on the wafer. The method also comprises the step of recording the obtained information, e.g., on a high-capacity storage media, such as hard drive disk, or a stack of hard drive disks. The recorded information may relate to such processes as metallization, implantation, resist coating, chemical mechanical polishing after metallization, etc. Some operations may be repeated several times. The recorded information stored on a memory device may be used as a passport that accompanies the product. The information is very convenient for observing changes caused in selected points on the object by transition from process to process. This becomes possible due to structural conformity of the sequential files. If the final product has defects or deviations, the stored information will easily allow revealing the time, place on the product, and the source of the defect by retrieving the sought data. The same records can also be used for correlation between the defects or deviations and the failure of the final product on quality control and even during exploitation of the chip in a semiconductor device.

DETAILED DESCRIPTION OF THE INVENTION

Figure 1:
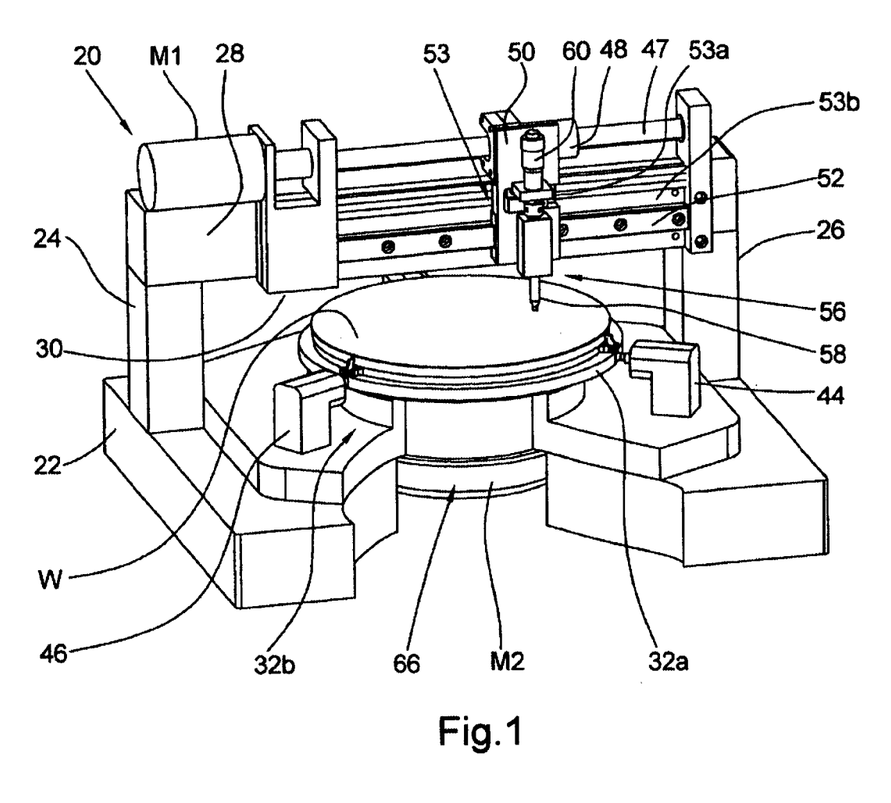
FIG. 1 is a general three-dimensional view of the apparatus of the invention.

A general schematic view of the apparatus of the invention is shown in FIG. 1.

The apparatus has a rectangular frame 20 formed by a base portion 22, two vertical columns 24 and 26, and a rigid upper crossbeam 28. The frame thus forms a wide opening 30 having a width and length sufficient to provide freedom of movements for below-described mechanisms of the apparatus.

Reference numeral 32 designates a rotary table, which is rotatingly installed in the base portion 22 of the frame 20 and is driven into rotation from a rotary motor 34. The motor 34 is provided with an encoder 35 and has a central hole that forms a channel of a vacuum system mentioned below.

Figure 2:
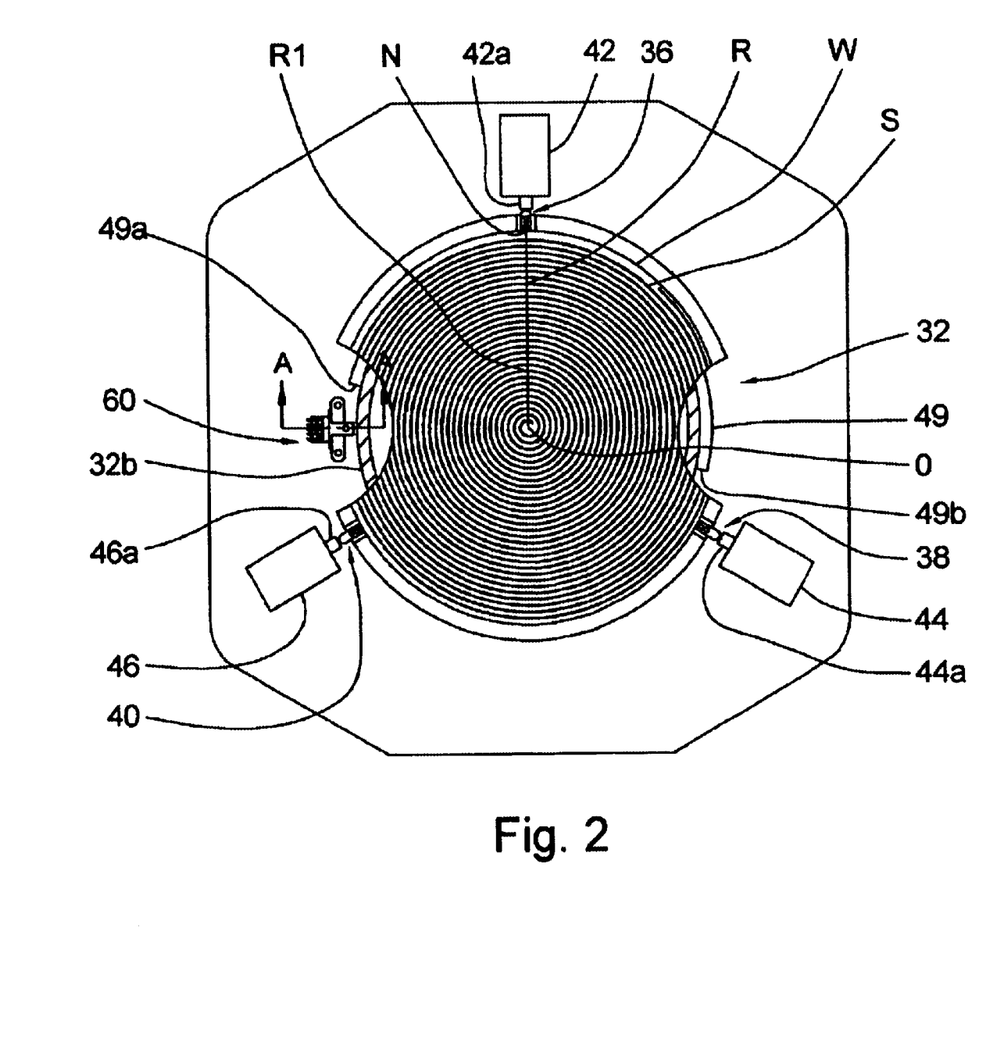
FIG. 2 is a top view of the semiconductor wafer installed on the rotary table of the apparatus of FIG. 1 in the initial position for measurement.

FIG. 2 is a top view of the semiconductor wafer W installed on the rotary table 32 of the apparatus of FIG. 1 in the initial position for measurement. The rotary table 32 is intended for supporting an object to be treated, e.g., a semiconductor wafer W which is fixed on the table 32 in a predetermined initial position with the use of a marked item on the object, e.g., a V-shaped notch N available almost in all standard semiconductor wafers for orientation of the wafers in various units of the manufacturing equipment. In the embodiment of the invention shown below, the semiconductor wafer is designed for operation with wafers having orientation notches, although the principle of the invention is applicable also to handling wafers with orientation flats.

It is known that, in production, semiconductor wafers are normally stored in wafer cassettes in which the wafers are arranged with pre-oriented positions of their notches or flats. An example of such a device is a wafer cassette station RS8161 compatible with FOUP [front opening unified port] (the product of Rorze Co., Milpitas, Calif., USA).

For the purposes of the present invention, it is important to orient each semiconductor wafer prior to measurement in a predetermined position for each measurement with a predetermined orientation of the notch (or flat) relative to the rotary table 32. The semiconductor wafers are taken by a mechanical robot from a wafer cassette with a pre-oriented position of the notch (or flat) and loaded into the rotary table 32 with the aforementioned pre-oriented position of the notch N. The construction of the robot and the wafer cassette with the notch orientation mechanism are beyond the scope of the present invention and therefore these devices are not shown and not described. The final accurate precision positioning of the wafer W in the position for initiation of measurement is carried out with a mechanism described below.

More specifically, as shown in FIG. 2, the apparatus is provided with solenoids, e.g., three solenoids 42, 44, and 46 installed on the base portion 22 of the frame 20 and arranged circumferentially around the periphery of the rotary table 32. The rotary table 32 supports clamping pins 36, 38, and 40 which are also circumferentially spaced from each other at the same angular distances as the aforementioned solenoids 42, 44, and 46.

Figure 3A:
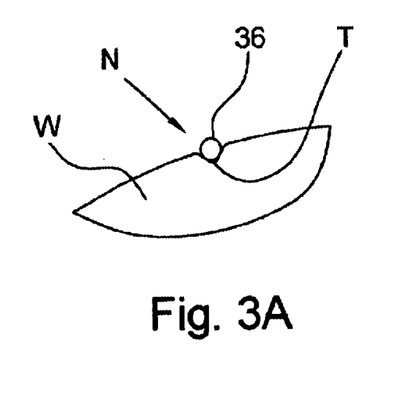
FIG. 3A is a fragmental top view of the wafer W illustrating position of one of the clamping pins in the notch N of the wafer.
Figure 3B:
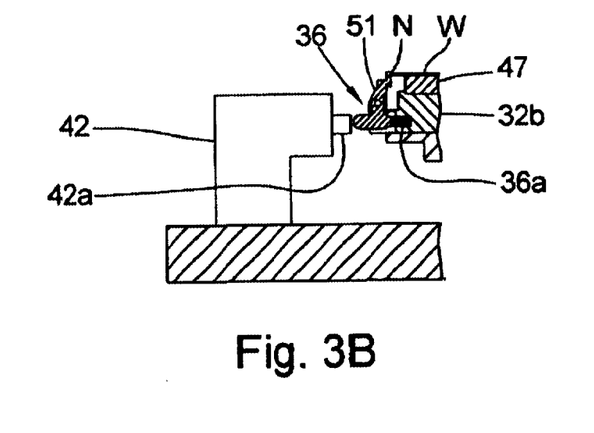
FIG. 3B is a sectional view of the clamping mechanism in the wafer clamping position.
Figure 3C:
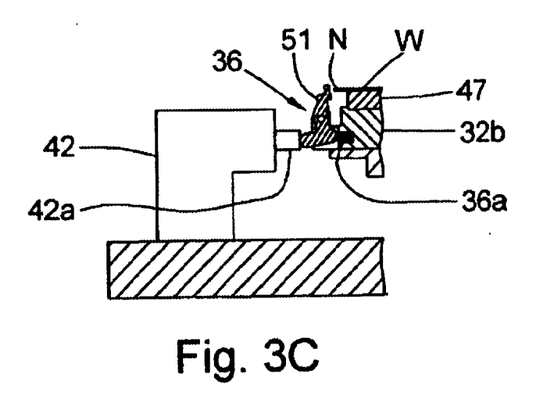
FIG. 3C is a view of the clamping mechanism similar to FIG. 3B but with the clamping pin in the wafer release position.

FIGS. 3A, 3B, and 3C illustrate positions of one of the pins, e.g., the clamping pin 36, and the principle of clamping of the semiconductor wafer W. FIG. 3A is a fragmental top view of the wafer W illustrating position of the pin 36 in the notch N of the wafer. FIG. 3B is a sectional view of the clamping mechanism in the wafer clamping position, and FIG. 3C is the view of the clamping mechanism similar to FIG. 3B but with the pin 36 in the wafer release position.

Although only one pin 36 is shown in FIGS. 3A–3C, it is understood that all three pins 36, 38, and 40 are pivotally supported on the table and are spring-loaded by springs, similar to a spring 36a shown in FIGS. 3B and 3C, e.g., through an articulation three-arm lever 51, one arm of which engages the spring 36a, the second arm engages the aforementioned plunger 42a of the solenoid 42, and the third arm comprises the aforementioned clamping pin 36. When the solenoids 42, 44, and 46 are activated, the respective articulation three-arm levers 51 are turned into the position of disengagement from the edge of the wafer W. The pin 36 is withdrawn from the notch N and the wafer W is released for removal from the chuck. On the other hand, when the solenoids are de-energized, the springs, such as the spring 36a, shown in the drawings, are decompressed and turn the articulated levers 51 to positions in which the pins 36, 38, 40 engages the edge of the semiconductor wafer W. The pin 36 enters the notch N and comes into contact with the deepest point T of the notch N (FIG. 3A). As a result, the wafer W is centered with the rotary table 32 with a high accuracy, e.g., on an order of several microns, and is fixed in the initial position for measurements.

The robot (not shown) loads a semiconductor wafer W onto the chuck portion 47 of the rotary table 32 in the home position of the table 32, in which the pin 36 is always aligned with the position of the notch N.

Prior to application of the wafer W onto the chuck portion 47 of the rotary table 32, when the table 32 is in a stationary state, the clamping pins 36, 38, and 40 are moved by means of the articulation lever 51 away from the periphery of the semiconductor wafer W against the force of their respective springs, such as the spring 36a. This is achieved by energizing the aforementioned solenoids 42, 44, and 46, the plungers of which (only one of which, i.e., the plunger 42a, is shown in FIG. 3) engage the aforementioned articulation lever 51. The plungers are not kinematically connected to the articulation mechanisms but only engage them for retraction of the clamping pins 36, 38, and 40 from the semiconductor wafer W when the table 32 is in the home position for loading and unloading of the wafers. In the outwardly retracted positions the pins do not interfere with the edge of the wafer and ensure unobstructed movement for the robot arm fingers.

As soon as the semiconductor wafer W is placed onto the rotary table 32, the robot or a sensor (not shown) on the apparatus of the invention sends a command to the solenoids 42, 44, and 46 for de-energizing the solenoids 42, 44, and 46 so that pins 36, 38, and 40 are released and returned by their respective springs, such as the spring 36a, to their normal positions. In other words, the pins 36, 38, and 40 are moved radially inwardly, and the pin 36 located in the notch N centers the semiconductor wafer W with a high accuracy, e.g., on an order of several microns. The plungers are moved away from the articulation lever 51 for not interfering with the rotation of the table.

The rotary table 32 consists of an upper disk 32a with the chuck portion 47 and a lower disk 32b (FIG. 1 and FIG. 2). The lower disk 32b carries on its outer periphery a thin flag portion 49 which has a predetermined length and occupies a part of the circumferential periphery of the lower disk 32b.

The rotary table 32 may be equipped with a standard vacuum wafer holder (not shown in FIG. 1) that can be used for flattening the semiconductor wafer to ensure flatness within the tolerances required for precision recording. The aforementioned central opening of the motor 34 with an encoder may be used as a channel of the vacuum system.

The crossbeam supports a lead screw 47 rotatingly installed in the crossbeam 28 in a diametrical direction above the rotary table 32. The screw 47 is rotated, e.g., from a motor M1 and engages a nut 48 rigidly attached to a carriage 50. As shown in FIG. 1, the crossbeam 28 is provided with a side guide rail 52 attached to the side of the crossbeam 28. The guide rail 52 serves for guiding the carriage 50 along the screw 46.

The carriage 50 supports a moveable part 53a of a linear encoder 53, e.g., a reading head, while the crossbeam 28 supports a stationary part of the linear encoder 53, e.g., a scale 53b of the linear encoder 53 which interacts with the moveable part 53a. The linear encoder unit may comprise a commercially available product, e.g., the one produced by Heidenhain Co., Ohio, USA.

In order to provide a relatively slow movement of the carriage 50 across the wafer surface and at the same time to ensure micrometric adjustment for installing the sensor 58 into initial measurement position, the lead screw should be a fine-pitch screw, e.g., the one produced by Thompson Co., N.Y., USA). The aforementioned slow movement is controlled by the aforementioned linear encoder unit 53.

Figure 4:
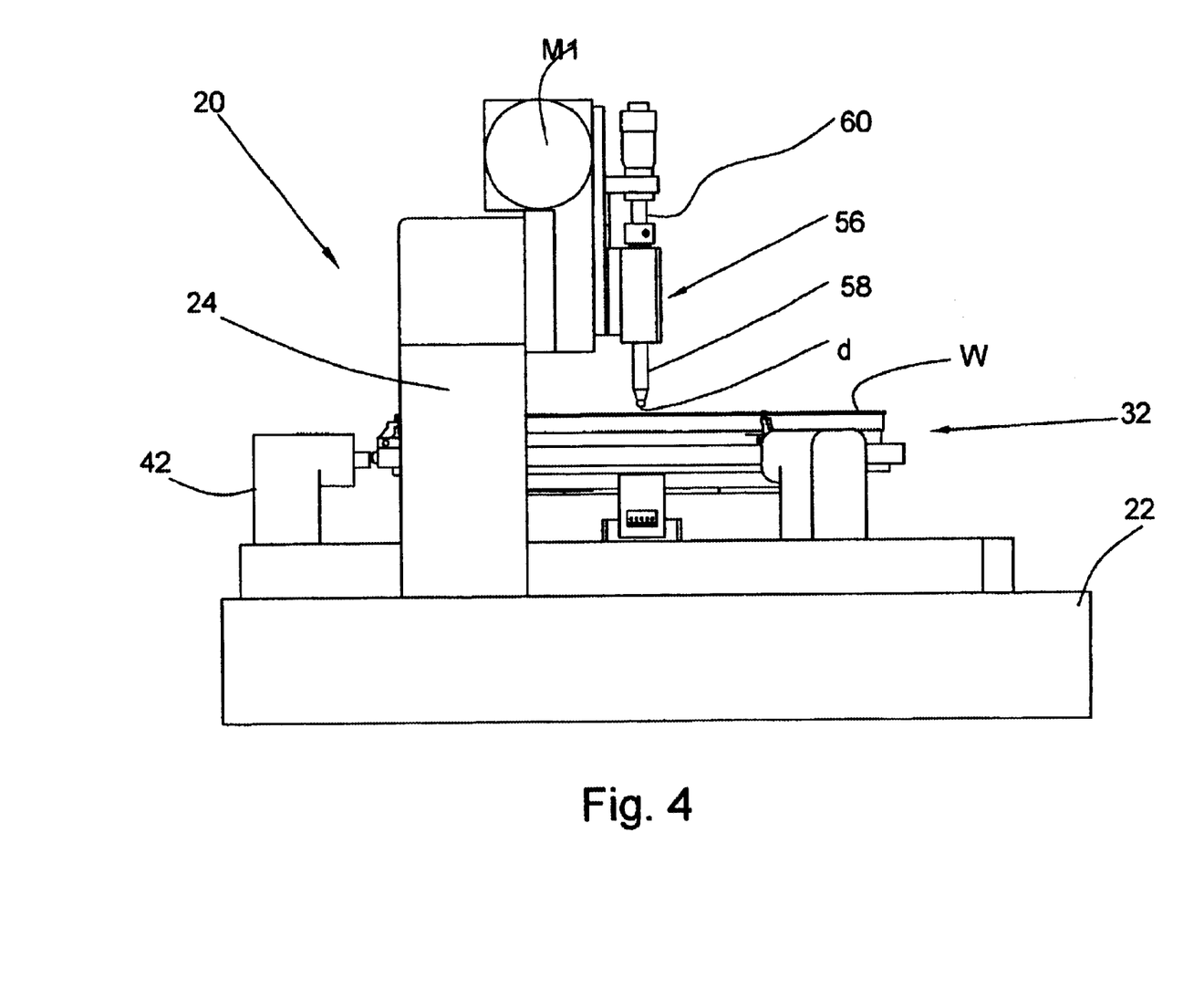
FIG. 4 is side view of the apparatus of the invention.

The carriage 50 supports a measuring head 56 with an RST sensor 58 located in close proximity to the surface of the semiconductor wafer W when the latter is installed in the home position on the rotary table 32. The carriage has a micrometric adjustment mechanism 60 of a known type (see, e.g. the one produced by New Focus Co., San Jose, Calif., USA, or Mitutoya America Corporation, IL, USA.), which is necessary for accurately adjusting the magnitude of a measurement gap "d" between the tip of the RST sensor 58 and the surface of the wafer W. The gap "d" is shown in FIG. 4, which is a side view of the apparatus of the invention, and the meaning of this gap will be described later. If necessary, the aforementioned adjustment mechanism may be supplemented with a standard piezo actuator and/or a measurement optical microinterferometer of the type described in aforementioned U.S. Pat. No. 6,593,738.

As has been mentioned above, initiation of each continuous measurement after each selected manufacturing stage from the same reference point on each disk is an important issue for the apparatus and method of the invention. For example, as shown in FIG. 2, in the illustrated embodiment of the invention, the reference position for initiation of continuous measurement along a spiral track S is the one in which the radius R coincides with a line that connects the deepest point T of the notch N with the center O of rotation of the wafer W.

Figure 5:
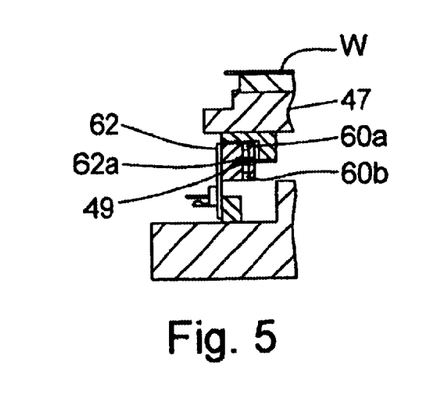
FIG. 5 is a fragmental sectional view illustrating the construction of the through beam sensor.

In the embodiment of the invention shown in FIGS. 1–4, the aforementioned finding of the initial position for measurement is achieved by utilizing a through beam sensor 60 the position of which is shown in FIG. 2. The construction of the through beam sensor 60 is shown in FIG. 5. The sensor 60 comprises a U-shaped bracket 62 installed on the base portion 22 of the frame 20 so that the aforementioned flag portion 49 on the outer periphery of the lower disk 32b may pass, during rotation of the rotary table 32, through the recess of the 62a (FIG. 5). The bracket 62 supports a light-transmitting element 60a, e.g., a laser diode, and a light-receiving element 60b, e.g., a photodiode. The laser diode 60a and the photodiode 60b are arranged so that a beam B emitted vertically from the laser diode 60a is received by the photodiode 60b and so that this beam can be blocked by the flag portion 49 on a part of revolution of the rotary table 32. The through-beam sensor 60 may detect the leading and trailing edges of the flag portion 49 with a very high accuracy. The term "leading edge" means the front end of the flag portion 49 in the direction of joint rotation with the rotary table 36, and the term "trailing edge" means the rear end of the flag portion 49 in the direction of joint rotation with the rotary table 36.

The outputs of the sensor are connected to the central processing unit the function of which is described later.

The aforementioned motor 34 is also provided with an angular 66 the indexed element of which (not shown) is installed on a rotating part, e.g., on the rotary table or on the output shaft of the motor (not shown), while the reading head (not shown) is attached to the stationary part of the base portion 22 in a position suitable for reading the angular positions of the indexed element. The construction of an angular encoder is known and the encoder may comprise a separate unit, e.g., a commercially available device produced by Heidenhain Co., or may comprise a unit built into a commercially available motor, e.g., Series CM-5000, 5" brushless DC motor produced by Computer Optical Products, Inc., CA, USA. The embodiment of the invention shown in FIGS. 1–5 utilizes the encoder of the last-mentioned type.

When the light beam B is overlapped with the leading edge 49a of the flag portion 32b, an appropriate command from the sensor 60 send a command for dropping the speed of the motor 34 to a very slow speed, and when the trailing edge 49b of the flag portion 32b unblocks the beam B, the motor is immediately stopped. In the last-mentioned stopped position of the motor 34, the table 32 and, hence the wafer W, assume the aforementioned initial position for measurement. The accuracy of such control may achieve several angular seconds.

All aforementioned commands that control the operations of the motor 34, motor 48, process the signals obtained from the laser diode 60a, photodiode 60b, encoder 66, activate the vacuum system, receive the useful measurement signal, records the results of measurement, etc. are controlled by a central processing unit 70 (hereinafter referred to as CPU 70) which is shown in a block diagram of FIG. 6. The CPU is also connected to work stations 72a, 72b, . . . 72n, on which the semiconductor wafer W is sequentially treated, and to a data storage unit 74 of high memory capacity for recording the measurement data obtained on all or selected work stations.

Figure 7:
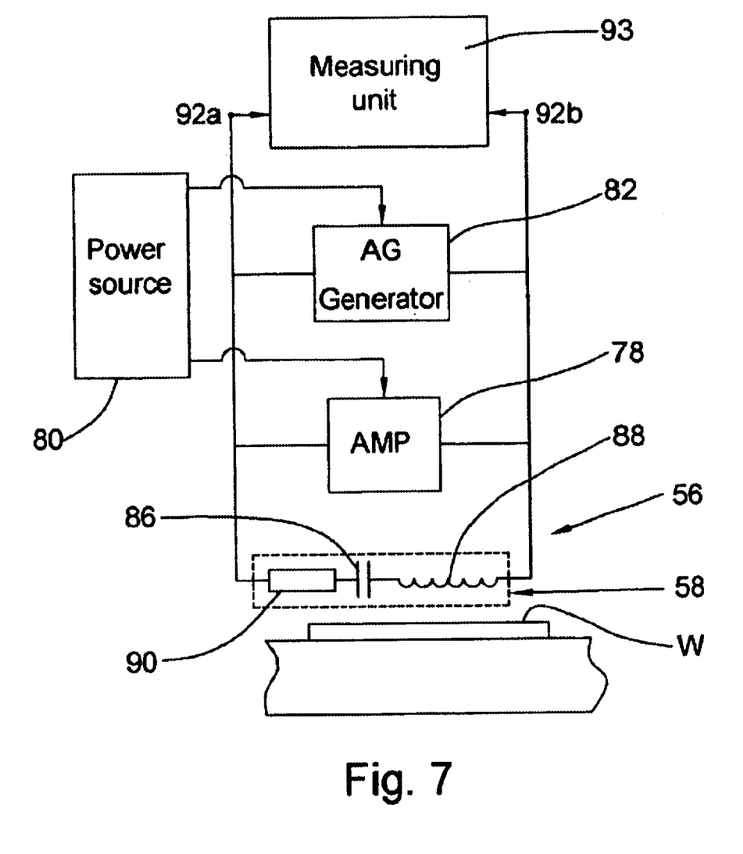
FIG. 7 is an electric circuit of a resonance sensor head.

Let us know consider the construction of the aforementioned RST sensor head 56 and the RST sensor 58 in more detail. FIG. 7 is an electric circuit of a resonance sensor head 56 in accordance with one of the embodiments of the RST sensor units disclosed in earlier U.S. patent application Ser. No. 10/359,378 of the same applicants filed on Feb. 7, 2003.

The sensor head 56 consists of the RST sensor 58 connected in parallel with an amplifier 78 connected to a power source 80, a high-frequency AC generator 82 with an amplitude modulator M, and a measurement unit 84. The RST sensor 58 comprises a resonance oscillating circuit formed by a capacitor 86, an inductance 88, and a resistor 90 connected, e.g., in series. The inductance comprises the winding of the inductive coil. Although the capacitor 86 and resistor 90 are shown as separate physical elements, they may comprise the inherent capacitance and resistance of the inductive coil 90. The aforementioned oscillating circuit may also be characterized by a specific inherent resonance frequency. The circuit that contains the amplifier consists of the amplifier 78 and the power supply 80. The circuit that consists of the high-frequency AC generator 82 with the amplitude modulator M is connected in parallel between the ground G and the sensor 58. The output terminals 92a and 92b of the measurement unit 93 (FIG. 7) are connected to the CPU 70 (FIG. 6).

Embodiments of actual constructions of the measurement head 56 and the RST sensor are described and shown in more detail in aforementioned U.S. patent application Ser. No. 10/359,378. Furthermore the schematic presentation shown in FIGS. 1–4, 6 is given only as an example and that the RST head and sensor may have other arrangements suitable for the formation of a sensor-object system that occurs during operation of the RST sensor.

The apparatus of the invention operates as follows. Let us consider the case of processing a semiconductor wafer W on a plurality of workstations 72a, 72b, . . . 72n (FIG. 6). First, the manufacturing procedure is analyzed for revealing the basic processes that are most of all subject to occurrence of defects or deviations. Let us consider the case where such stations are the workstation 72a, 72b, and 72n on which the semiconductor wafer W is subject to implantation, metallization, and chemical mechanical polishing, respectively.

A semiconductor wafer W is taken from the FOUP of the wafer cassette (not shown) and is placed onto the chuck portion 47 of the rotary table 32 with the notch N in a position pre-oriented closed to alignment of the notch N with one of the clamping pins. In this stage, the rotary table is stationary and is in the home position for initiation of the measurement. The semiconductor wafer W is then fixed on the table 32 with the use of the mechanism shown in FIG. 3 and operating in a manner described above. Upon completion of the wafer fixation operation, the CPU 70 sends a command to the vacuum system (not shown) to generate a force for flattening of the wafer. If the wafer had some buckling, the vacuum suction force flattens the surface of the wafer with the deviation from flatness not exceeding 1 to few microns.

Let us assume that in the illustrated embodiment the reference position for initiation of continuous measurement along a spiral track S (FIG. 2) is the one in which the radius R coincides with a line that connects the deepest point T (FIG. 3) of the notch N with the center O of rotation of the wafer W. Finding of the initial position 0 for measurement is achieved by utilizing a beam B1 emitted from the laser diode 60a and received by the photodiode 60b. As has been mentioned above, when during rotation of the rotary table 32 the leading edge 49a of the flag portion 49 blocks the beam B1, the CPU 70 sends the command to decelerate the motor M2 and when after the trailing edge 49b of the flag portion passes the sensor 60 and unblocks the passage of the beam B1, the output signal of the photodiode 60b sends a command to the CPU 70 for complete stopping of the motor M2 exactly in the home position. In this position, the clamping pin 36 is always aligned with the notch N.

The encoder incorporated into the motor M2 makes it possible to stop the table exactly at the point of alignment of the trailing edge 49b of the flag portion 49 with the beam B1. The encode provides a very high positioning accuracy (e.g., several angular seconds). The aforementioned control of the installation into the initial position can also be carried out by detecting the maximum value of the output signal from the photodiode 60b.

Let us assume that in the present embodiment of the invention the measurements are started from the center O of the wafer with the movement of the RST sensor 58 in the radial outward direction till it approaches the periphery of the semiconductor wafer. The apparatus may be provided with a limit switch (not shown) for preventing collision of the sensor with the clamping pins or other parts of the apparatus beyond the periphery of the wafer. The movements are carried out by driving the carriage 50 from the motor M1 along the guide rail 52 due to engagement of the nut 48 with the screw 47.

Since rotation of the rotary table 32 should be strictly synchronized with linear movement of the carriage 50, which is important for reproducibility of the subsequent measurements that have to be started each time from the same position, it is very important to maintain predetermined strict correlation between the rotation frequency of the table and the linear movements of the carriage 50. For example, the table 32 may rotate either with a strictly constant rotation frequency or with a rotation frequency that maintains strictly constant linear speed of the wafer W in each current point of measurement. It is understood that as the RST sensor 58 moves in the radial outward direction during rotation of the wafer, the frequency of rotation of the wafer should be reduced in accordance with the law expressed by the formula $f \sim V/R_1$, where f is the frequency of rotation of the table 32, V is the aforementioned linear speed, and $R_1$ is a current radial coordinate of the sensor 58 along radius R (FIG. 2).

In the aforementioned control, a very high positional accuracy is achieved by controlling the rotation frequency with the use of the angular encoder 66 and the linear encoder 53.

After the tip of the RST sensor 58 is installed into the initial measurement position corresponding to point O in FIG. 2, the measurement is started. The real track of each record will comprise a spiral S (FIG. 2) developed from point O to the periphery of the wafer and is ended under a command of the CPU 70 or when the carriage 50 engages the limit switch (not shown).

The sensor 58 can be precalibrated relative to the material of the object to be measured (the calibration procedure is described in aforementioned U.S. patent application Ser. No. 10/359,378) or can be used without precalibration for obtaining certain conditional values which will be correlated with selected parameters of the wafer on subsequent stages of manufacturing.

Figure 8A:
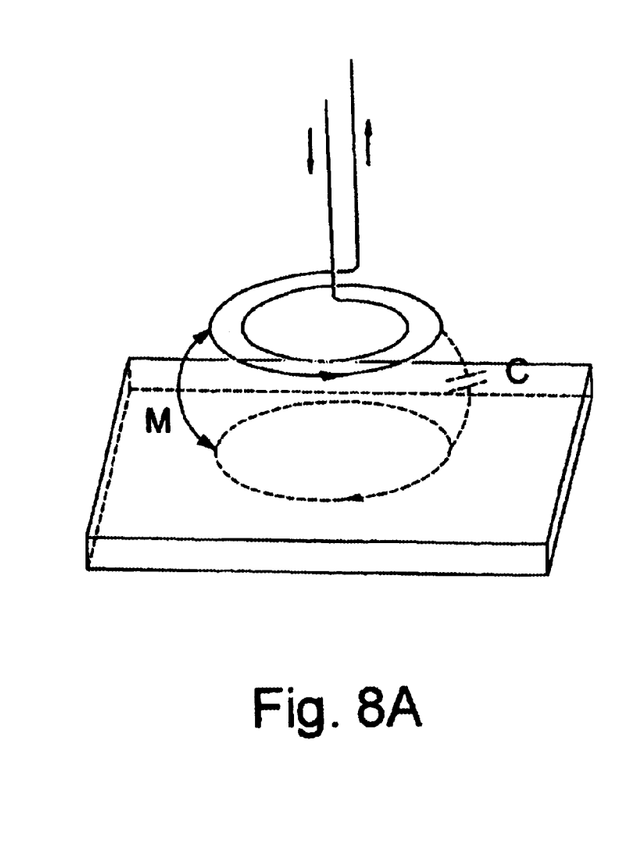
FIG. 8A shows an operation mode of the RST sensor of the invention for measuring characteristics of a metal coating.
Figure 8B:
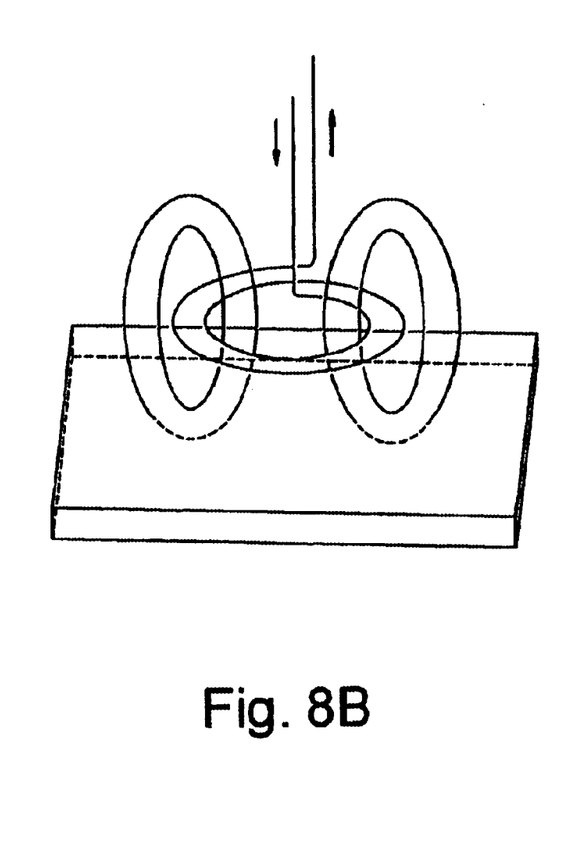
FIG. 8B shows an operation mode of the RST sensor of the invention for measuring characteristics of a dielectric coating.

For example, the same RST sensor 58 (FIG. 1 and FIG. 4) can be used for measuring characteristics of a metal coating 89 (FIG. 8A) and of a dielectric coating 91 (FIG. 8B). The operation of the RST sensor in the modes corresponding to FIGS. 8A and 8B has been described in detail in aforementioned prior patent applications of the same applicants relating to the RST.

Figure 6:
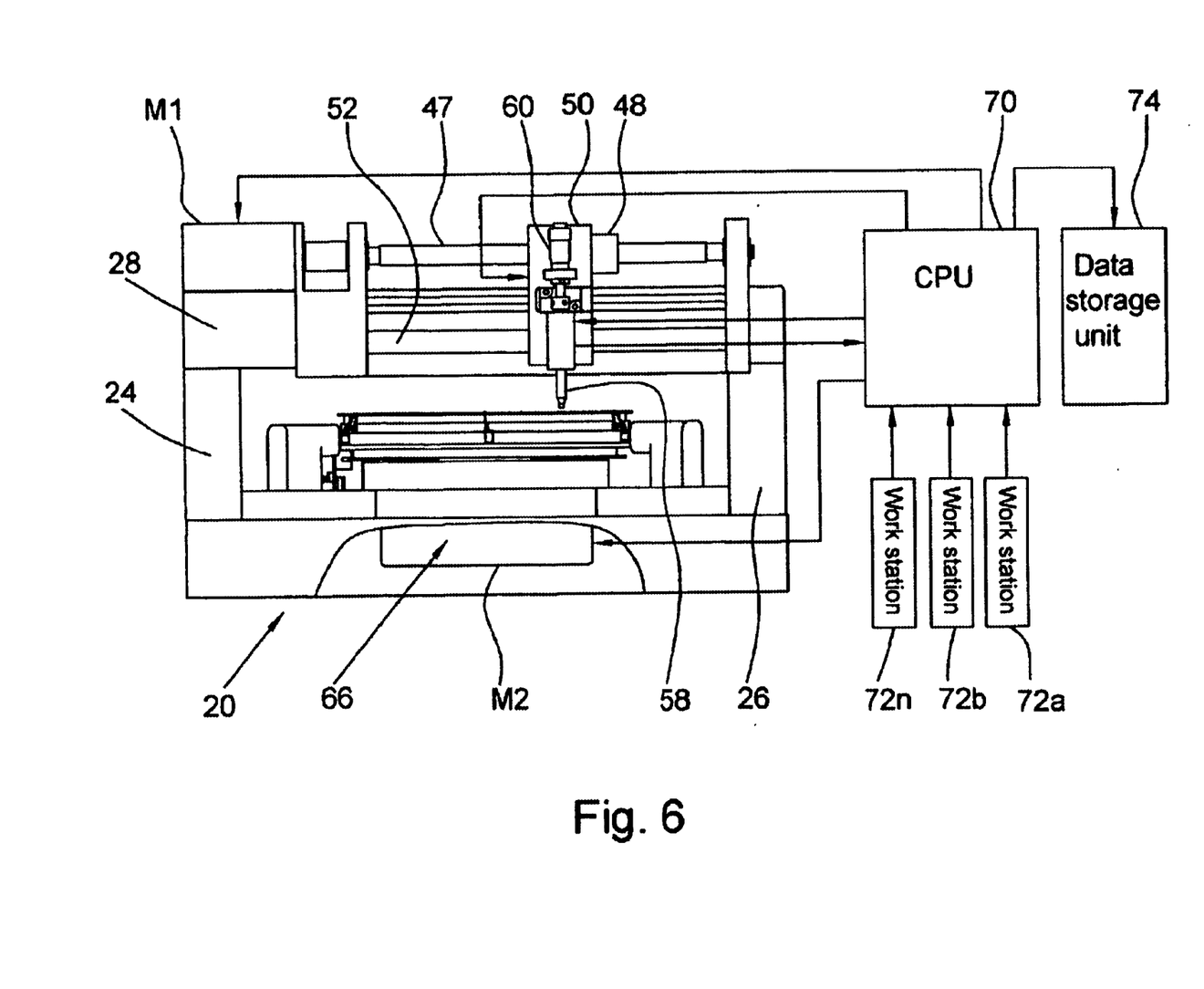
FIG. 6 is a schematic view of the apparatus of the invention with a block-diagram of control units.

The method of the invention comprises recording the information obtained from the RST sensor on a high-capacity data storage device 74 via the CPU 70 (FIG. 6). For example, if identical measurements started from the same initial point are recoded after treatment of the wafer on twenty workstations 72a, 72b, . . . 72n, the information relating to the treatment on each or selected station will be recorded in manner describe above by multiple identical scans each time started from the same point on the wafer. If the final product has a defect or deviations, the information stored on the disk will easily allow, e.g., with the use of a computer, to reveal the time, place on the wafer, and the source of the defect by retrieving the associated information from the data storage device 74. The same records can also be used for correlation between the defects or deviations and the failure of the final product on quality control and even during exploitation of the product.

Thus, it has been shown that the invention provides apparatus and method for continuous recording characteristics on the surfaces of semiconductor wafers or similar products on all or selected stages of the manufacture and treatment. The aforementioned characteristics are measured in conductive and non-conductive materials by means of a generalized or universal sensor unit in the form of a certain relative value. The method and apparatus of the invention are based on the principles of the resonance sensor technology (RST).

Although the invention has been shown and described with reference to specific embodiments, it is understood that these embodiments should not be construed as limiting the areas of application of the invention and that any changes and modifications are possible, provided these changes and modifications do not depart from the scope of the attached patent claims. For example, the spiral track may be started on the periphery of the wafer and go inwardly towards point O with the initial point located on the outer turn of the spiral track. One or several replaceable sensors can be used for different frequencies used simultaneously or in separate operations. This is because more detailed information can be obtained with some frequencies on dielectrics and with other frequencies on semiconductors or metals. The movement of the carriage with the RST sensor can be discrete rather than continuous. Sensors may be different and selected, e.g., from the previous patent applications of the same applicant. The RST sensor can be combined with optical sensors, or the like. The objects may comprise compact disks, floppy disks of high density, etc. The entire apparatus may have a configuration different from the one shown in FIG. 1 and may utilize linear scanning rather than spiral tracks, e.g., for scanning rectangular objects, such as PC boards and flat panel displays.

What is claimed is:

1. An apparatus for carrying out identical continuous records of characteristics on the surface of an object after selected stages of manufacture and treatment of said objects comprising:
   a rigid frame;
   a rotary table rotatingly supported in said frame, said rotary table having means for centering said objects and having a center of rotation and a periphery;
   rotary drive means installed on said rigid frame for rotating said rotary table;
      guide means on said rigid frame located above said rotary table and extending in a direction across said rotary table;
   a carriage moveable along said guide means and supporting a resonance sensor unit having a resonance sensor based on resonance sensor technology, said carriage having vertical adjustment means capable of adjusting a measurement distance between said resonance sensor and the surface of said object;
   linear drive means for moving said carriage with said resonance sensor unit along said guide means, said apparatus having an initial position for starting said identical continuous records;
   first positioning means for accurately positioning said rotary table angularly in said initial position;
   second positioning means for accurately positioning said resonance sensor linearly in said initial position;
   third positioning means for accurately positioning said object on said rotary table in said initial position; and
   a central processing unit connected to said rotary drive means, said linear drive means, first said positioning means, said second positioning means, and said third positioning means, said rotary movement of said rotary table and said linear movement of said carriage being strictly correlated with each other through said central processing unit;
   said object having a marking item.

2. The apparatus of claim 1, wherein said first positioning means comprise: a flag portion attached to said rotary table for joint rotation therewith and a rotary table angular position sensing means installed on said rigid frame, said flag portion having a length, a leading edge on the front end of said length in the direction of said joint rotation and a trailing edge on the rear end of said length.

3. The apparatus of claim 2, wherein said rotary table angular position sensing means comprises a light-emitting element that emits a light beam and a light-receiving element that is located at a space from said light-emitting element and senses said light beam, said flag portion passing through said space during said joint rotation of said flag portion so that said passage of said beam to said light-receiving element is interrupted.

4. The apparatus of claim 3, wherein said light-emitting element is a laser diode and said light-receiving element is a photodiode.

5. The apparatus of claim 4, wherein said second positioning means comprise a linear encoder having a reading head on one of said carriage and said rigid frame and a scale element on the other of said carriage and said frame.

6. The apparatus of claim 1, wherein said second positioning means comprise a linear encoder having a reading head on one of said carriage and said rigid frame and a scale element on the other of said carriage and said frame.

7. The apparatus of claim 6, wherein said first positioning means comprise: a flag portion attached to said rotary table for joint rotation therewith and a rotary table angular position sensing means installed on said rigid frame, said flag portion having a length, a leading edge on the front end of said length in the direction of said joint rotation and a trailing edge on the rear end of said length.

8. The apparatus of claim 7, wherein said rotary table angular position sensing means comprises a light-emitting element that emits a light beam and a light-receiving element that is located at a space from said light-emitting element and senses said light beam, said flag portion passing through said space during said joint rotation of said flag portion so that said passage of said beam to said light-receiving element is interrupted.

9. The apparatus of claim 8, wherein said light-emitting element is a laser diode and said light-receiving element is a photodiode.

10. The apparatus of claim 9, wherein said third positioning means comprise a plurality of clamping elements arranged circumferentially uniformly around said periphery of said object, at least one of said clamping elements engaging said marking item.

11. The apparatus of claim 1, wherein said third positioning means comprise a plurality of clamping elements arranged circumferentially uniformly around said periphery of said object, at least one of said clamping elements engaging said marking item.

12. The apparatus of claim 11, further provided with clamping pin moving means installed on said rigid frame and engaging said clamping pins for moving said clamping pins radially outwardly/inwardly in order to provide unobstructed access for said object to initial position on said rotary table and to clamp said object in said initial position, respectively.

13. The apparatus of claim 12, wherein said object is a semiconductor wafer and said marking item is a V-shaped notch on a semiconductor wafer, said clamping pins being spring-loaded with springs so that when said clamping pin moving means engages said claming pins, said clamping pins move radially outwardly, and when said clamping pin moving means are out of engagement with said clamping pins, said springs move said damping pins radially inwardly against said semiconductor wafer for clamping said semiconductor wafer.

14. The apparatus of claim 13, wherein said third positioning means comprise a plurality of clamping elements arranged circumferentially uniformly around said periphery of said object, at least one of said clamping elements engaging said marking item.

15. The apparatus of claim 2, wherein said third positioning means comprise a plurality of clamping elements arranged circumferentially uniformly around said periphery of said object, at least one of said clamping elements engaging said marking item.

16. The apparatus of claim 15, further provided with clamping pin moving means installed on said rigid frame and engaging said clamping pins for moving said clamping pins radially outwardly/inwardly in order to provide unobstructed access for said object to initial position on said rotary table and to clamp said object in said initial position, respectively.

17. The apparatus of claim 16, wherein said object is a semiconductor-wafer and said marking item is a V-shaped notch on a semiconductor wafer, said clamping pins being spring-loaded with springs so that when said clamping pin moving means engages said claming pins, said clamping pins move radially outwardly, and when said clamping pin moving means are out of engagement with said clamping pins, said springs move said clamping pins radially inwardly against said semiconductor wafer for clamping said semiconductor wafer.

18. The apparatus of claim 5, wherein said third positioning means comprise a plurality of clamping elements arranged circumferentially uniformly around said periphery of said object, at least one of said clamping elements engaging said marking item.

19. The apparatus of claim 18, further provided with clamping pin moving means installed on said rigid frame and engaging said clamping pins for moving said clamping pins radially outwardly/inwardly in order to provide unobstructed access for said object to initial position on said rotary table and to clamp said object in said initial position, respectively.

20. The apparatus of claim 19, wherein said object is a semiconductor wafer and said marking item is a V-shaped notch on a semiconductor wafer, said clamping pins being spring-loaded with springs so that when said clamping pin moving means engages said claming pins, said clamping pins move radially outwardly, and when said clamping pin moving means are out of engagement with said clamping pins, said springs move said clamping pins radially inwardly against said semiconductor wafer for clamping said semiconductor wafer.

21. The apparatus of claim 1, wherein said resonance sensor unit comprises:
a resonance oscillating circuit characterized by inherent inductance, inherent capacitance, and an inherent resonance frequency;
a high-frequency AC generator with an amplitude modulator connected to said sensor means;
an amplifier connected to said sensor means;
a measurement unit connected to said central processing unit;
said resonance oscillating circuit having such a relationship between said inherent inductance and inherent capacitance that provides a capacitive and inductive coupling between said sensor unit and said object.

22. The apparatus of claim 2, wherein said resonance sensor unit comprises:
a resonance oscillating circuit characterized by inherent inductance, inherent capacitance, and an inherent resonance frequency;
a high-frequency AC generator with an amplitude modulator connected to said sensor means;
an amplifier connected to said sensor means;
a measurement unit connected to said central processing unit;
said resonance oscillating circuit having such a relationship between said inherent inductance and inherent capacitance that provides a capacitive and inductive coupling between said sensor unit and said object.

23. The apparatus of claim 4, wherein said resonance sensor unit comprises:
a resonance oscillating circuit characterized by inherent inductance, inherent capacitance, and an inherent resonance frequency;
a high-frequency AC generator with an amplitude modulator connected to said sensor means;
an amplifier connected to said sensor means;
a measurement unit connected to said central processing unit;
said resonance oscillating circuit having such a relationship between said inherent inductance and inherent capacitance that provides a capacitive and inductive coupling between said sensor unit and said object.

24. The apparatus of claim 5, wherein said resonance sensor unit comprises:
a resonance oscillating circuit characterized by inherent inductance, inherent capacitance, and an inherent resonance frequency;
a high-frequency AC generator with an amplitude modulator connected to said sensor means;
an amplifier connected to said sensor means;
a measurement unit connected to said central processing unit;
said resonance oscillating circuit having such a relationship between said inherent inductance and inherent capacitance that provides a capacitive and inductive coupling between said sensor unit and said object.

25. The apparatus of claim 9, wherein said resonance sensor unit comprises:
a resonance oscillating circuit characterized by inherent inductance, inherent capacitance, and an inherent resonance frequency;
a high-frequency AC generator with an amplitude modulator connected to said sensor means;
an amplifier connected to said sensor means;
a measurement unit connected to said central processing unit;
said resonance oscillating circuit having such a relationship between said inherent inductance and inherent capacitance that provides a capacitive and inductive coupling between said sensor unit and said object.

26. The apparatus of claim 10, wherein said resonance sensor unit comprises:
- a resonance oscillating circuit characterized by inherent inductance, inherent capacitance, and an inherent resonance frequency;
- a high-frequency AC generator with an amplitude modulator connected to said sensor means;
- an amplifier connected to said sensor means;
- a measurement unit connected to said central processing unit;

said resonance oscillating circuit having such a relationship between said inherent inductance and inherent capacitance that provides a capacitive and inductive coupling between said sensor unit and said object.

27. The apparatus of claim 14, wherein said resonance sensor unit comprises:
- a resonance oscillating circuit characterized by inherent inductance, inherent capacitance, and an inherent resonance frequency;
- a high-frequency AC generator with an amplitude modulator connected to said sensor means;
- an amplifier connected to said sensor means;
- a measurement unit connected to said central processing unit;

said resonance oscillating circuit having such a relationship between said inherent inductance and inherent capacitance that provides a capacitive and inductive coupling between said sensor unit and said object.

28. The apparatus of claim 1, wherein said predetermined initial position is located in said center of rotation of said rotary table.

29. The apparatus of claim 21, wherein said predetermined initial position is located in said center of rotation of said rotary table.

30. The apparatus of claim 23, wherein said predetermined initial position is located in said center of rotation of said rotary table.

31. The apparatus of claim 24, wherein said predetermined initial position is located in said center of rotation of said rotary table.

32. The apparatus of claim 25, wherein said predetermined initial position is located in said center of rotation of said rotary table.

33. The apparatus of claim 26, wherein said predetermined initial position is located in said center of rotation of said rotary table.

34. The apparatus of claim 27, wherein said predetermined initial position is located in said center of rotation of said rotary table.

35. The apparatus of claim 1, further comprising a data storage device connected to said central processing unit.

36. The apparatus of claim 21, further comprising a data storage device connected to said central processing unit.

37. The apparatus of claim 22, further comprising a data storage device connected to said central processing unit.

38. The apparatus of claim 23, further comprising a data storage device connected to said central processing unit.

39. The apparatus of claim 24, further comprising a data storage device connected to said central processing unit.

40. The apparatus of claim 25, further comprising a data storage device connected to said central processing unit.

41. The apparatus of claim 26, further comprising a data storage device connected to said central processing unit.

42. The apparatus of claim 27, further comprising a data storage device connected to said central processing unit.

43. A method for multiple identical continuous records of characteristics on the surface of an object after selected stages of manufacture and treatment, said method comprising the steps of:

(a) providing an apparatus for multiple identical continuous records of characteristics on the surface of an object after selected stages of manufacture and treatment, said apparatus comprising a rotary table for rotatingly supporting said object, positioning means on said rotary table for installing said object precisely in a predetermined initial position in each installation for starting said identical continuous records from a predetermined starting point after said selected stages of manufacture and treatment, measuring means with a resonance sensor based on resonance sensor technology for measuring characteristics of said object, and recording means for recording the results of measurements;

(b) treating said object on one of said selected stages;

(c) placing said object onto said rotary table of said apparatus upon completion of treatment on said one of said selected stages;

(d) positioning said object in said predetermined initial position;

(e) measuring characteristics of said object with the use of said resonance sensor along a continuous track on said object while rotating said object with a predetermined frequency of rotation and while moving said resonance sensor linearly across said object with a predetermined linear speed which is strictly correlated with said frequency of rotation; and (f) recording characteristics of said object measured with said resonance sensor;

(g) treating said object on another of said selected stages; and (h) repeating said steps from (c) to (f).

44. The method of claim 43, wherein said steps (c) to (f) are repeated after all of said selected stages.

45. The method of claim 43, wherein said object is a semiconductor wafer having a center and a periphery, said rotary table having a center of rotation, said method comprising the steps of:

placing said semiconductor wafer in a position on said rotary table in which said center of rotation of said table coincides with said center of said semiconductor wafer;

selecting said predetermined starting point in said center of rotation; and measuring characteristics of said object while moving said resonance sensor and rotating said rotary table with said semiconductor wafer so that said continuous track comprises a spiral curve started in said center of rotation and developed radially outwardly towards said periphery of said semiconductor wafer.

46. The method of claim 43, further comprising the step of correlating said linear speed of said resonance sensor with rotation of said rotary table with said semiconductor wafer according to a predetermined law; and observing said law in measuring characteristics of said object after each of said selected stages.

* * * * *